US009046056B2

United States Patent
Lerg

(10) Patent No.: US 9,046,056 B2
(45) Date of Patent: Jun. 2, 2015

(54) INLET PARTICLE SEPARATOR SYSTEM FOR A GAS TURBINE ENGINE

(75) Inventor: Bryan H. Lerg, Westfield, IN (US)

(73) Assignee: Rolls-Royce North American Technologies, Inc., Indianapolis, IN (US)

(*) Notice: Subject to any disclaimer, the term of this patent is extended or adjusted under 35 U.S.C. 154(b) by 1454 days.

(21) Appl. No.: 12/631,811

(22) Filed: Dec. 5, 2009

(65) Prior Publication Data
US 2010/0162682 A1 Jul. 1, 2010

Related U.S. Application Data

(60) Provisional application No. 61/203,714, filed on Dec. 26, 2008.

(51) Int. Cl.
| | |
|---|---|
| F02K 3/02 | (2006.01) |
| B01D 45/06 | (2006.01) |
| F02C 7/052 | (2006.01) |
| F02K 3/04 | (2006.01) |
| F02C 7/05 | (2006.01) |
| F02C 7/055 | (2006.01) |

(52) U.S. Cl.
CPC . *F02K 3/02* (2013.01); *B01D 45/06* (2013.01); *F02C 7/052* (2013.01); *F05D 2250/411* (2013.01); *F05D 2250/51* (2013.01); *F05D 2260/607* (2013.01); *Y02T 50/675* (2013.01); *F02K 3/04* (2013.01); *F02C 7/05* (2013.01); *F02C 7/055* (2013.01)

(58) Field of Classification Search
CPC .................................. F02K 3/06; F02K 3/075
USPC .......... 60/226.1, 779, 39.092, 39.091, 226.3; 415/121.2; 55/440
See application file for complete search history.

(56) References Cited

U.S. PATENT DOCUMENTS

| | | | |
|---|---|---|---|
| 2,931,460 | A | 4/1960 | McEachern |
| 3,368,332 | A | 2/1968 | Hooper et al. |
| 3,421,296 | A | 1/1969 | Beurer, Sr. |
| 3,449,891 | A | 6/1969 | Shohet et al. |
| 3,465,950 | A | 9/1969 | Freid et al. |
| 3,513,641 | A | 5/1970 | Hopper et al. |
| 3,521,431 | A | 7/1970 | Connors et al. |

(Continued)

FOREIGN PATENT DOCUMENTS

| | | |
|---|---|---|
| GB | 1 201 096 | 8/1970 |
| GB | 2259328 A | 3/1993 |
| GB | 2 270 481 | 3/1994 |

OTHER PUBLICATIONS

International Search Report and Written Opinion, PCT/US09/66901, Apr. 30, 2010, Rolls-Royce North American Technologies, Inc.

(Continued)

*Primary Examiner* — Lindsay Low
*Assistant Examiner* — Omar Morales
(74) *Attorney, Agent, or Firm* — Krieg DeVault LLP

(57) ABSTRACT

Embodiments include an inlet particle separator system for a gas turbine engine. The inlet particle separator system includes an inertial particle separator that separates incoming air into a cleaned air flow and a scavenge flow. Embodiments may also include an ejector that provides a draw on a scavenge duct and entrains the scavenge flow into a charged flow, e.g., such as the output of a first stage fan. The ejector may have a variable output.

20 Claims, 3 Drawing Sheets

(56) References Cited

U.S. PATENT DOCUMENTS

| | | | |
|---|---|---|---|
| 3,534,548 | A | 10/1970 | Connors |
| 3,616,616 | A | 11/1971 | Flatt |
| 3,673,771 | A | 7/1972 | Dickey |
| 3,766,719 | A | 10/1973 | McAnally, III |
| 3,778,983 | A | 12/1973 | Rygg |
| 3,832,086 | A | 8/1974 | Hull, Jr. et al. |
| 3,970,439 | A | 7/1976 | Murphy |
| 3,977,811 | A | 8/1976 | Kuintzle, Jr. |
| 3,978,656 | A | 9/1976 | Murphy |
| 3,993,463 | A | 11/1976 | Barr |
| 4,137,705 | A | 2/1979 | Andersen et al. |
| 4,198,219 | A | 4/1980 | Krisko |
| 4,265,646 | A | 5/1981 | Weinstein et al. |
| 4,268,284 | A | 5/1981 | Kent et al. |
| 4,509,962 | A | 4/1985 | Breitman et al. |
| 4,527,387 | A | 7/1985 | Lastrina et al. |
| 4,591,312 | A | 5/1986 | Wenglarz |
| 4,592,765 | A | 6/1986 | Breitman et al. |
| 4,617,028 | A | 10/1986 | Ray et al. |
| 4,685,942 | A | 8/1987 | Klassen et al. |
| 4,702,071 | A | 10/1987 | Jenkins et al. |
| 4,704,145 | A | 11/1987 | Norris et al. |
| 4,860,534 | A | 8/1989 | Easley et al. |
| 4,928,480 | A * | 5/1990 | Oliver et al. ............... 60/39.092 |
| 5,039,317 | A | 8/1991 | Thompson et al. |
| 5,123,240 | A * | 6/1992 | Frost et al. ...................... 60/779 |
| 5,139,545 | A | 8/1992 | Mann |
| 5,201,801 | A | 4/1993 | Smith, Jr. |
| 5,222,693 | A | 6/1993 | Slutzkin et al. |
| 5,268,011 | A | 12/1993 | Wurz |
| 5,279,109 | A | 1/1994 | Liu et al. |
| 5,320,651 | A | 6/1994 | Drummond |
| 5,746,789 | A | 5/1998 | Wright et al. |
| 5,827,043 | A | 10/1998 | Fukuda et al. |
| 6,129,509 | A | 10/2000 | Cousin et al. |
| 6,134,874 | A | 10/2000 | Stoten |
| 6,183,641 | B1 | 2/2001 | Conrad et al. |
| 6,209,311 | B1 * | 4/2001 | Itoh et al. ..................... 60/226.3 |
| 6,499,285 | B1 | 12/2002 | Snyder |
| 6,508,052 | B1 | 1/2003 | Snyder et al. |
| 6,698,180 | B2 | 3/2004 | Snyder |
| 7,374,593 | B2 | 5/2008 | Snyder |
| 7,608,122 | B2 | 10/2009 | Snyder |
| 2003/0024232 | A1 | 2/2003 | Snyder et al. |
| 2003/0024233 | A1 | 2/2003 | Snyder |
| 2005/0166571 | A1 | 8/2005 | Marinell a Pavlatos |
| 2007/0000232 | A1 | 1/2007 | Powell |
| 2007/0186534 | A1 | 8/2007 | Snyder |
| 2007/0256558 | A1 | 11/2007 | Schwalm |

OTHER PUBLICATIONS

International Search Report and Written Opinion, PCT/US06/23883, Rolls-Royce North American Technologies Inc., Mar. 15, 2007.
Supplementary European Search Report, EP 06 78 5142, Rolls-Royce North American Technologies Inc., Sep. 30, 2009.
European Search Report, EP 12 00 1449, Rolls-Royce North American Technologies Inc., May 14, 2012.
Extended European Search Report, EP 09835497.0, Rolls-Royce North American Technologies, Inc., Oct. 15, 2013.

* cited by examiner

INLET PARTICLE SEPARATOR SYSTEM FOR A GAS TURBINE ENGINE

CROSS REFERENCE TO RELATED APPLICATIONS

The present application claims the benefit of U.S. Provisional Patent Application 61/203,714, filed Dec. 26, 2008, and is incorporated herein by reference.

GOVERNMENT RIGHTS

The present application was made with the United States government support under Contract No. F33615-03-D-2357 0010, awarded by the United States Air Force. The United States government has certain rights in the present application.

FIELD OF THE INVENTION

The present invention relates to gas turbine engines, and, more particularly, to an inlet particle separator system for a gas turbine engine.

BACKGROUND

Gas turbine engines are air-breathing machines, and are often required to operate in environments that include particulate matter in the air, for example, desert environments. In order to reduce damage to the engine, which may include erosion of static and rotating structures, as well to reduce the clogging of passages, e.g., such as turbine blade cooling passages, inlet particle separators are frequently employed. The present invention provides an improved inlet particle separator system for a gas turbine engine.

SUMMARY

The present invention provides an inlet particle separator system for a gas turbine engine. The inlet particle separator system includes an inertial particle separator that separates incoming air into a cleaned air flow and a scavenge flow. Embodiments may also include an ejector that provides a draw on a scavenge duct and entrains the scavenge flow into a charged flow, e.g., such as the output of a first stage fan. The ejector may have a variable output.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
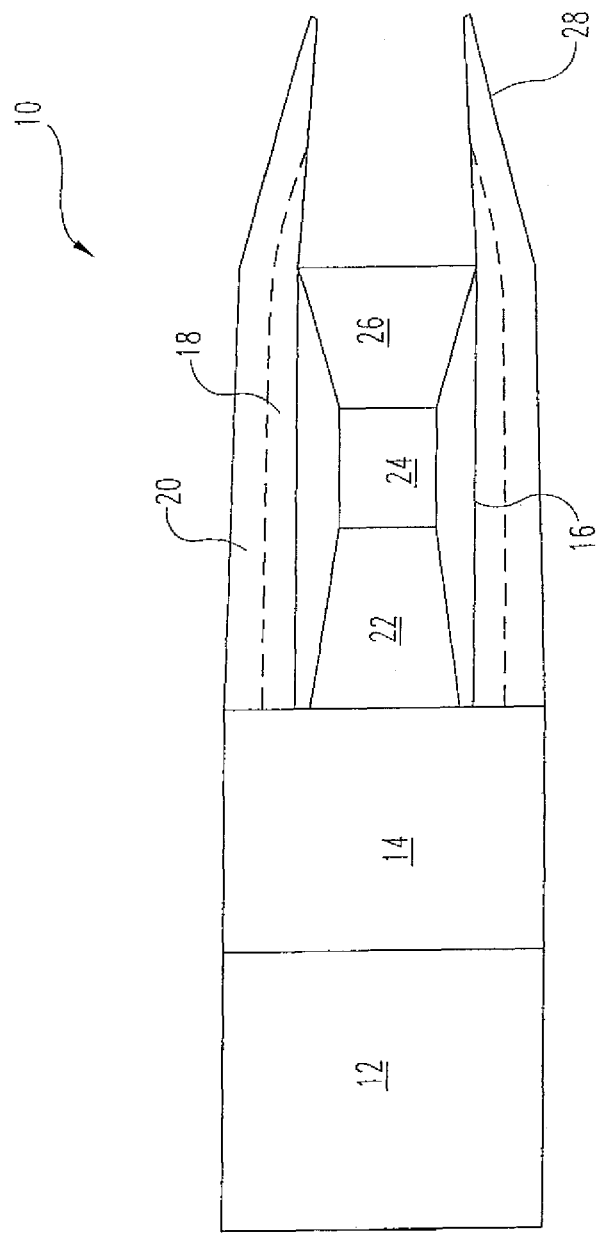
FIG. 1 is a schematic diagram of a gas turbine engine in accordance with an embodiment of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring now to the drawings, and in particular, FIG. 1, a gas turbine engine 10 in the form of a turbofan engine in accordance with an embodiment of the present invention is described. In the embodiment of FIG. 1, various features, components and interrelationships therebetween of aspects of an embodiment of the present invention are depicted. However, the present invention is not limited to the particular embodiment of FIG. 1 and the components, features and interrelationships therebetween as are illustrated in FIG. 1 and described herein.

Gas turbine engine 10 includes an inlet particle separator system 12, a fan section 14 and a core 16. Fan section 14 discharges pressurized air into a duct 18 and a duct 20. In one form, duct 18 is a bypass duct that is generally annular in shape and surrounds core 16. In one form, duct 20 is a bypass duct that is generally annular in shape and surrounds bypass duct 18. In other embodiments, however, ducts 18 and 20 may not be annular in shape, may or may not be bypass ducts, and/or may not surround core 16, but rather, may have shapes and locations/orientations suitable to the particular aircraft installation. For example, in some embodiments, one duct may be for a lift fan, whereas the other may be a conventional turbofan bypass duct.

Core 16 includes a compressor section 22, a combustor section 24 and a turbine section 26. Fan section 14 provides thrust using air received from inlet particle separator system 12. Fan section 14 is powered by core 16, in particular, turbine section 26. Gas turbine engine 10 includes a nozzle 28 for directing thrust produced by fan section 14 and core 16.

Figure 2:
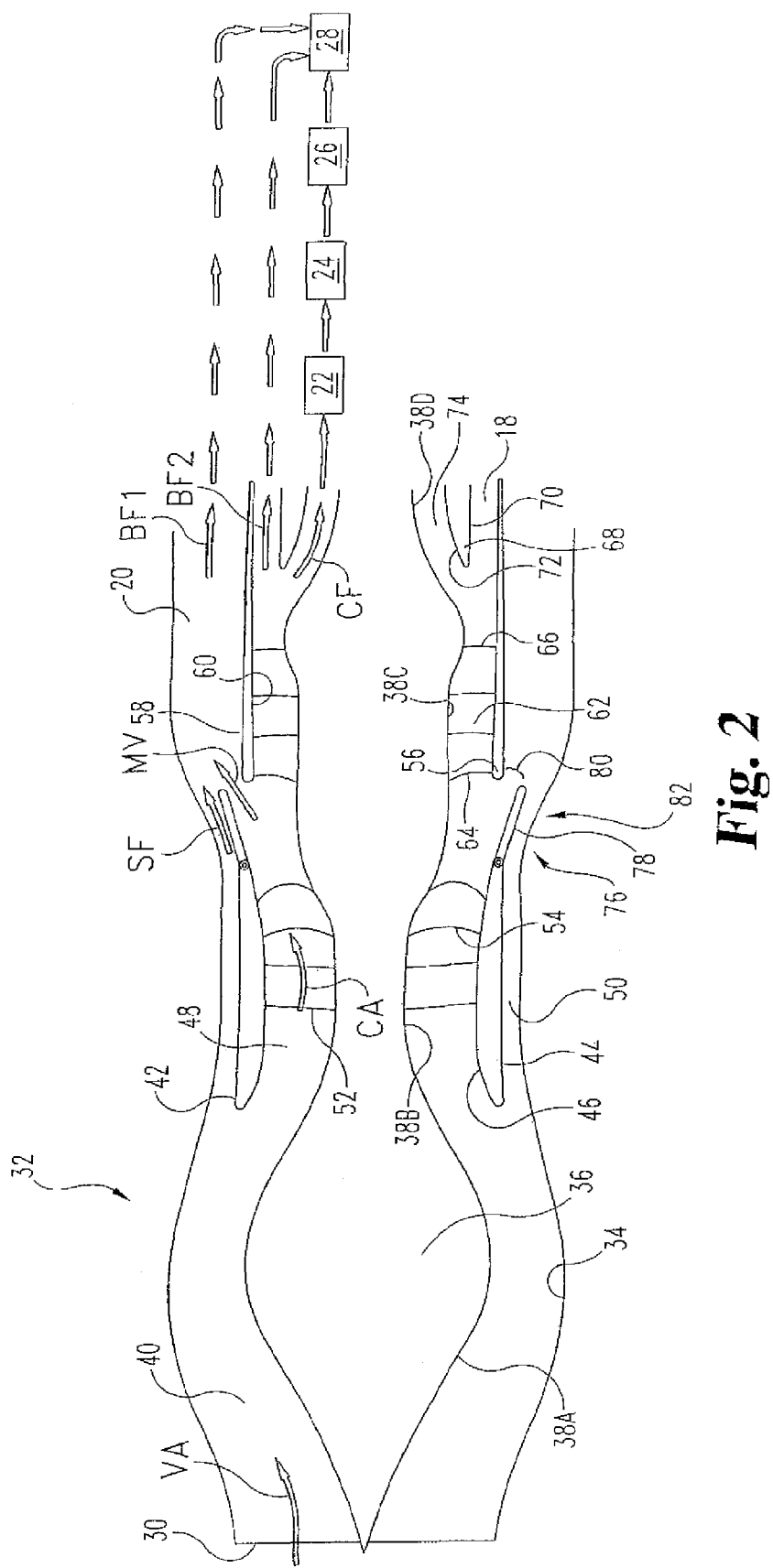
FIG. 2 schematically depicts an inlet particle separator system in accordance with an embodiment of the present invention.

Referring now to FIG. 2, gas turbine engine 10, and in particular, inlet particle separator system 12, is described in greater detail. Inlet particle separator system 12 includes a separator inlet 30 and an inertial particle separator 32. Separator inlet 30 is an opening that permits airflow into inertial particle separator 32 for subsequent use by gas turbine engine 10 in producing power e.g., during flight operations of an aircraft.

Inertial particle separator 32 is defined by an outer flowpath wall 34 and a shaped center body 36. Shaped center body 36 is defined by an inner flowpath wall 38A. Inner flowpath wall 38A and outer flowpath wall 34 define a flowpath 40 that imparts a radially outward velocity component to particles entrained in vitiated (for example, particle-laden) air VA received into separator inlet 30. After passing the apex of shaped center body 36, flowpath 40 curves radially inward, whereby the inertia of the particles tends to separate the particles from the inward-turning air by carrying the particles in the direction of outer flowpath wall 34.

A flow splitter 42 is positioned to separate the airflow in flowpath 40 into a scavenge flow SF containing a substantial portion of the particles contained in the vitiated air VA, and a "cleaned" air flow CA, that is, an airflow having a reduced particulate concentration relative to the vitiated air VA that was received into separator inlet 30. In one form, the location of flow splitter 42 in both radial and axial directions is selected to maximize particle separation at one or more operating points of engine 10. In one form, the location of flow splitter 42 is fixed. In other embodiments, the location of flow splitter 42 may vary with engine operating conditions and/or ambient conditions. In one form, flow splitter 42 is generally annular in shape, and forms two concentric ducts extending from inertial particle separator 32. In other embodiments, other flow splitter configurations may be employed.

Extending generally axially in the direction of flow from flow splitter 42 are an intermediate inner flowpath wall 44 and an intermediate outer flowpath wall 46. Inner flowpath wall 38B and intermediate outer flowpath wall 46 define a cleaned air flowpath 48 that receives the cleaned air flow CA from inertial particle separator 32. Flow splitter 42 defines a plane perpendicular to the general direction of flow that may be referred to as a cleaned air engine inlet. Intermediate inner flowpath wall 44 and outer flowpath wall 34 define a scavenge flowpath 50 that receives the scavenge flow discharged by inertial particle separator 32.

Disposed within cleaned air flowpath 48 are a plurality of inlet guide vanes 52 for directing air into a fan stage 54. Fan stage 54 is powered by turbine section 26, and is operative to pressurize, i.e., charge the cleaned air received in cleaned air flowpath 48. In one form, fan stage 54 is a first stage fan. In other embodiments, fan stage 54 may be a second and/or subsequent fan stage. In one form, the pressurized air output by fan stage 54 is used not only as part of the thrust-producing operations of gas turbine engine 10, but also, a portion of the pressurized air from fan stage 54 is employed to operate an ejector to provide a variable draw on scavenge flowpath 50. In other embodiments, other pressure sources may be employed to operate the ejector.

Downstream of scavenge flowpath 50 is first bypass duct 20 for directing a high velocity fan bypass flow BF1 around core 16 to nozzle 28. As that term is used herein, "bypass flow" or "fan bypass flow" refers not merely to air that does not enter core 16, but rather, pertains to a high speed flow of air pressurized by the fan of a turbofan engine (and/or the air pressurized by a lift fan) for use as a thrust producing component of the engine's output. Adjacent to bypass duct 20 is a flow splitter 56. Extending generally axially in the direction of flow from flow splitter 56 are an intermediate inner flowpath wall 58 and an intermediate outer flowpath wall 60. Outer flowpath wall 34 and intermediate inner flowpath wall 58 define the radial extents of bypass duct 20, and bound the bypass flow through bypass duct 20.

Inboard of flow splitter 56 is a flowpath 62 defined by intermediate outer flowpath wall 60 and inner flowpath wall 38C. Disposed within flowpath 62 are a variable guide vane 64 and another fan stage 66 downstream of variable guide vane 64. In one form, fan stage 66 is a second stage fan. In other embodiments, fan stage 66 may be a fan stage subsequent to a second stage fan.

Downstream of fan stage 66 is a flow splitter 68. Extending generally axially in the direction of flow from flow splitter 68 are an intermediate inner flowpath wall 70 and an intermediate outer flowpath wall 72. Intermediate outer flowpath wall 60 and intermediate inner flowpath wall 70 define bypass duct 18 for directing a high velocity fan bypass flow BF2 around core 16 to nozzle 28. Inner flowpath 38D and intermediate outer flowpath wall 72 define a core flowpath 74 for directing a core flow CF into core 16, e.g. into compressor section 22.

Disposed between fan stage 54 and variable guide vane 64 is a variable bleed system 76. In one form, variable bleed system 76 includes a plurality of circumferentially spaced bleed doors 78. Bleed doors 78 define for variable bleed system 76 a variable flow area, e.g., variable flow area 80, and effectively serve as a nozzle that provides a portion of the cleaned air flow CA exiting fan stage 54 as a motive fluid MV for operating an ejector that provides a draw on scavenge flowpath 50. In other embodiments, other valving mechanisms may be employed in addition to or in place of bleed doors 78 to provide motive fluid for the ejector. The balance of the cleaned air flow CA (e.g., not including leakage or other bleed flows) that is not discharged via bleed doors 78 is received into fan stage 66 via variable guide vane 64, from whence a portion is directed into core 16 as core flow CF, and a portion is directed via bypass duct 18 as bypass flow BF2 to nozzle 28.

Figure 3:
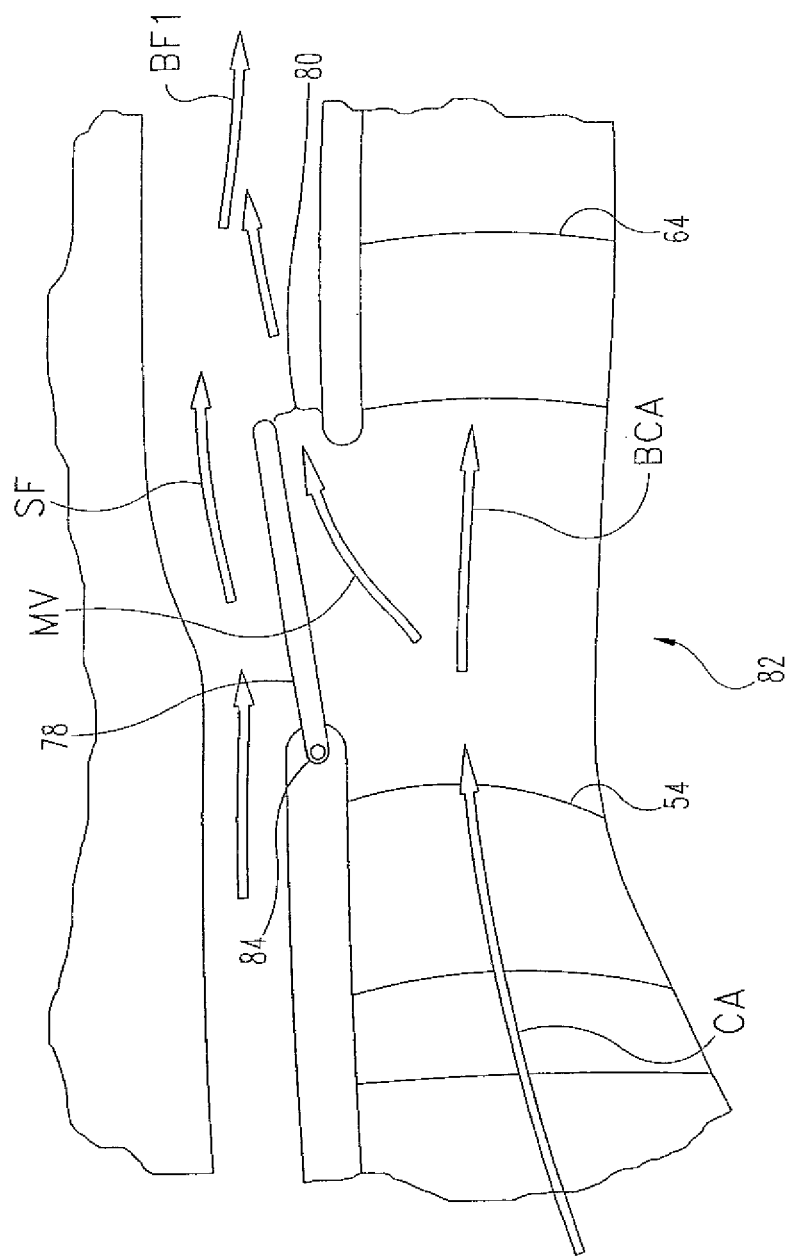
FIG. 3 depicts an embodiment of an ejector that may be used in the inlet particle separator system of FIG. 2 to draw a scavenge flow.

Referring now to FIG. 3, a variable output ejector 82 in accordance with an embodiment of the present invention is depicted. In the present embodiment, ejector 82 is formed by the cooperation of scavenge flowpath 50, bypass duct 20, and bleed doors 78 providing a variable flow area, such as variable flow area 80.

In one form, bleed doors 78 are attached to static structure downstream of flow splitter 42 via a pivot joint 84, e.g., a hinge. In other embodiments, bleed doors 78 may be otherwise secured to static structure. Pivot joint 84 allows each bleed door 78 to pivot between a minimum bleed flow position and a maximum bleed flow position. In one form, bleed doors 78 close against flow splitter 56 to yield a minimum bleed flow position that results in no bleed flow (not accounting for leakages). In other embodiments, bleed doors 78 may be configured for a non-zero minimum bleed flow position. In one form, bleed doors 78 are opened and closed by a bleed door actuation system (not shown) in a controlled manner so as to controllably vary the flow area through bleed doors 78, e.g., resulting in variable flow area 80, and hence providing ejector 82 with variable output capability. Although the present embodiment employs bleed doors 78 to provide the variable flow area, it is alternatively contemplated that other mechanisms may be employed to provide a variable flow area in other embodiments. For example, an iris nozzle system or a sleeve valve configuration may be employed to provide a variable annular aperture.

During the operation of engine 10, air enters separator inlet 30. In some environments in which engine 10 is operating, the air may be vitiated, i.e., containing particulate matter. As the vitiated air VA is drawn into inertial particle separator 12, it is accelerated radially outwards, imparting a radially outward momentum to particles entrained in the air. As vitiated air VA continues in the direction of flow toward fan section 14, flowpath 40 turns sharply inwards. A substantial amount of the particles entrained in vitiated air VA are at this point carrying too much momentum in the radially outward direction and hence flow into scavenge flowpath 50. The balance of the air and any remaining particles enter cleaned air flowpath 48 inboard of flow splitter 42, and are drawn into fan section 14 as cleaned air flow CA under the impetus provided by fan stage 54.

Fan stage 54 pressurizes cleaned air flow CA. In one form, a portion of cleaned air flow CA is directed via variable bleed system 76 into bypass duct 20 as the motive fluid MV of ejector 82. The flow directed into bypass duct 20 contributes to the thrust output of gas turbine engine 10, and may be varied in amount, depending upon engine 10 and/or aircraft needs. For example, the amount of flow directed into bypass duct 20 may be controlled to vary in accordance with the needs of the aircraft in a particular flight regime and/or other particular mission requirements and/or engine 10 operating conditions. The balance of cleaned air flow CA, identified in FIG. 3 as BCA, is directed into fan stage 66 via variable guide vane 64, some of which is directed to nozzle 28 as bypass flow BF2 via bypass duct 18, and the balance of which is directed to core 16. Because the motive fluid MV flow is generated by the first fan stage, i.e., fan stage 54, only a relatively small amount of work has been done on the air, e.g., relative to using bleed air from fan stage 66, compressor section 22 or turbine section 26, which may result in increased efficiency of engine 10 relative to other engines that may employ such sources for driving a particle separator.

The amount of cleaned air flow CA directed into bypass duct 20 as motive fluid MV for ejector 82 may vary with the needs of the aircraft in a particular flight regime and/or other particular mission requirements. For example, under conditions requiring increased particle separation, it may be desirable to increase the amount of flow of motive fluid MV by opening bleed doors 78.

In one form, the flow requirements of inertial particle separator 32 are balanced by variable bleed system 76 and variable guide vanes 64, which are each actuated by mechanisms (not shown) in a controlled manner to direct a desired amount of cleaned air CA into bypass duct 20 as motive fluid MV. The variable flow area provided by variable bleed system 76, e.g., variable flow area 80, accelerates the motive fluid MV, reducing the static pressure of motive fluid MV to less than the total pressure in scavenge flowpath 50 adjacent bleed doors 78, thereby providing a draw on scavenge flowpath 50 and entraining scavenge flow SF. In one form, the amount of draw provided is varied by directing more or less motive fluid MV into bypass duct 20 via variable bleed system 76, thereby providing a variable output of ejector 82. In other embodiments, the amount of motive fluid MV directed into bypass duct 20 may be fixed or may be varied by other means. By varying the output of ejector 82, the flow balance between cleaned air flow CA and scavenge flow SF may be optimized under each flight condition and/or engine 10 operating condition to maximize the particle separation efficiency of inertial particle separator 32.

Some embodiments of the present invention may include an inlet particle separator system for a gas turbine engine. The inlet particle separator system may include a separator inlet structured to receive a vitiated air flow; an inertial particle separator in fluid communication with the separator inlet, the inertial particle separator structured to receive the vitiated air flow and discharge a cleaned air flow and a scavenge flow; a scavenge flowpath positioned to receive the scavenge flow from the inertial particle separator; a cleaned air flowpath positioned to receive the cleaned air flow from the inertial particle separator; a variable output ejector in fluid communication with the flowpaths, the variable output ejector being structured to provide a variable draw on the scavenge flowpath using a portion of the cleaned air flow as a motive fluid for operating the variable output ejector; and a cleaned air engine inlet in fluid communication with the cleaned air flowpath, the cleaned air engine inlet structured to receive the balance of the cleaned air flow and to direct the balance into the gas turbine engine as at least one of a core flow and a fan bypass flow of the gas turbine engine.

The gas turbine engine may include a fan stage of upstream of the ejector, the fan stage structured to pressurize the cleaned air flow, the motive fluid thereby being pressurized, the variable ejector structured to entrain the scavenge flow with the motive fluid.

The inlet particle separator system may include a variable bleed system having a variable flow area, the variable bleed system structured to vary the amount of the cleaned air flow used as the motive fluid. The variable bleed system may be structured to reduce the static pressure of the motive fluid to a pressure below the total pressure of the scavenge flow. The variable bleed system may include a plurality of bleed doors, each bleed door having a minimum flow position and a maximum flow position, the plurality of bleed doors structured to vary the flow area by moving between the minimum flow position and the maximum flow position. A variable guide vane may be structured to cooperate with the variable bleed system to direct the motive fluid through the variable output ejector.

The variable output ejector may include means for varying the draw on the scavenge flowpath.

In another embodiment, an inlet particle separator system for a turbofan engine may include a separator inlet structured to receive a vitiated air flow; a particle separator in fluid communication with the separator inlet and structured to output a cleaned air flow from the vitiated air flow; a scavenge flowpath in fluid communication with both the particle separator and a first fan bypass duct of the turbofan engine, the first bypass duct being configured to direct a first bypass flow, the scavenge flowpath structured to receive a scavenge flow from the particle separator and to discharge the scavenge flow into the first fan bypass duct; an ejector in fluid communication with particle separator, the scavenge flowpath and the first fan duct, the ejector being structured to provide a draw on the scavenge flowpath using a portion of the cleaned air flow as a motive fluid for operating the ejector; and an engine inlet structured to receive the balance of the cleaned air flow and to direct the cleaned air flow into at least one of an engine core of the turbofan engine as a core flow and a second bypass duct of the turbofan engine as a second bypass flow.

The inlet particle separator system may include a variable bleed system having a variable flow area, the variable bleed system structured to vary the amount of the cleaned air flow used as the motive fluid. The variable bleed system structured to reduce the static pressure of the motive fluid to a pressure below the total pressure of the scavenge flow. The variable bleed system may include a plurality of bleed doors, each bleed door having a minimum flow position and a maximum flow position, the plurality of bleed doors structured to vary the flow area by moving between the minimum flow position and the maximum flow position.

A variable guide vane may be structured to cooperate with the variable bleed system to direct the motive fluid through the ejector.

In yet another embodiment, a gas turbine engine may include a fan stage; an inlet particle separator system in fluid communication with the fan stage, the inlet particle separator system including: a separator inlet structured to receive a vitiated air flow; an inertial particle separator in fluid communication with the separator inlet, the inertial particle separator structured to receive the vitiated air flow and discharge a cleaned air flow and a scavenge flow; a scavenge flowpath positioned to receive the scavenge flow from the inertial particle separator; a clean air flowpath positioned to receive the cleaned air flow from the inertial particle separator and direct the cleaned air flow into the fan stage; and a variable output ejector in fluid communication with the flowpaths, the variable output ejector being structured to provide a variable draw on the scavenge flowpath using a portion of the cleaned air flow exiting the fan stage as a motive fluid for operating the variable output ejector; the gas turbine engine also including: a compressor section in fluid communication with the inlet particle separator system; a combustor section in fluid communication with the compressor section; and a turbine section in fluid communication with the combustor.

The fan stage may be upstream of the ejector, the fan stage structured to pressurize the cleaned air flow, the motive fluid thereby being pressurized, the variable ejector structured to entrain the scavenge flow using the motive fluid and discharge a combined flowstream formed of the motive fluid and the scavenge flow.

The gas turbine engine may include a turbofan bypass duct in fluid communication with the ejector and structured to direct the combined flowstream. An other turbofan bypass duct may be structured to direct at least some of the cleaned air flow as an other bypass flow different than the combined flowstream. An other fan stage structured to receive the balance of the cleaned air flow.

The gas turbine engine may include a variable bleed system having a variable flow area, the variable bleed system structured to vary the amount of the cleaned air flow used as the motive fluid. The variable bleed system may be structured to reduce the static pressure of the motive fluid to a pressure below the total pressure of the scavenge flow. The variable bleed system may include a plurality of bleed doors, each bleed door having a minimum flow position and a maximum flow position, the plurality of bleed doors structured to vary the flow area by moving between the minimum flow position and the maximum flow position.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. An inlet particle separator system for a gas turbine engine, comprising:
   a separator inlet structured to receive a vitiated air flow;
   an inertial particle separator in fluid communication with the separator inlet positioned upstream of a fan, wherein the inertial particle separator includes an outer flowpath wall and an inner flowpath wall that define an inlet pathway to receive the vitiated air flow and discharge a cleaned air flow and a scavenge flow, a first portion of the inlet pathway extending radially outward to an apex and a second portion of the inlet pathway extending radially inward from the apex such that scavenge flow is directed radially outward towards the outer flowpath wall;
   a flow splitter having an intermediate outer flowpath wall and an intermediate inner flowpath wall positioned downstream of the inertial particle separator;
   a scavenge flowpath defined by the intermediate outer flowpath wall of the flow splitter and the outer flowpath wall of the inlet pathway positioned to receive the scavenge flow from the inertial particle separator;
   a cleaned air flowpath defined by the intermediate inner flowpath wall of the flow splitter and the inner flowpath wall of the inlet pathway positioned to receive the cleaned air flow from the inertial particle separator;
   a variable output ejector in fluid communication with said flowpaths, wherein said variable output ejector is structured to provide a variable draw on the scavenge flowpath using a portion of the cleaned air flow as a motive fluid for operating said variable output ejector; and
   a cleaned air engine inlet in fluid communication with the cleaned air flowpath, wherein the cleaned air engine inlet is structured to receive the balance of the cleaned air flow and to direct the balance into the gas turbine engine as at least one of a core flow and a fan bypass flow of the gas turbine engine.

2. The inlet particle separator system of claim 1, wherein said variable ejector is structured to entrain the scavenge flow with the motive fluid.

3. The inlet particle separator system of claim 1, further comprising a variable bleed system having a variable flow area, wherein the variable bleed system is structured to vary the amount of the cleaned air flow used as the motive fluid.

4. The inlet particle separator system of claim 3, wherein said variable bleed system is structured to reduce the static pressure of the motive fluid to a pressure below the total pressure of the scavenge flow.

5. The inlet particle separator system of claim 3, wherein said variable bleed system includes a plurality of bleed doors, each bleed door having a minimum flow position and a maximum flow position; and wherein the plurality of bleed doors are structured to vary the flow area by moving between the minimum flow position and the maximum flow position.

6. The inlet particle separator system of claim 3, further comprising a variable guide vane structured to cooperate with said variable bleed system to direct the motive fluid through the variable output ejector.

7. The inlet particle separator system of claim 1, wherein said variable output ejector includes a movable wall positioned between the scavenge flowpath and the cleaned air flowpath, wherein the movable wall is movable between a closed position and a fully open position within the scavenge flowpath for varying the draw on the scavenge flowpath.

8. An inlet particle separator system for a turbofan engine, comprising:
   a separator inlet structured to receive a vitiated air flow;
   a particle separator positioned upstream of a fan in fluid communication with said separator inlet and structured to output a cleaned air flow from the vitiated air flow, wherein the particle separator includes an outer flowpath wall and an inner flowpath wall that define an inlet pathway;
   a first portion of the inlet pathway extending radially outward to an apex and a second portion of the inlet pathway extending radially inward from the apex such that scavenge flow is directed radially outward towards the outer flowpath wall;
   a flow splitter having an intermediate outer flowpath wall and an intermediate inner flowpath wall positioned downstream of the particle separator;
   a scavenge flowpath in fluid communication with both said particle separator and a first fan bypass duct of the turbofan engine, wherein the first bypass duct is configured to direct a first bypass flow; and wherein said scavenge flowpath is further defined by the intermediate outer flowpath wall of the flow splitter and the outer flowpath wall of the inlet pathway and is structured to receive a scavenge flow from the particle separator and to discharge the scavenge flow into the first fan bypass duct;

an ejector in fluid communication with particle separator, the scavenge flowpath and the first fan duct, wherein said ejector is structured to provide a draw on the scavenge flowpath using a portion of the cleaned air flow as a motive fluid for operating said ejector; and an engine inlet structured to receive the balance of the cleaned air flow and to direct the cleaned air flow into at least one of an engine core of the turbofan engine as a core flow and a second bypass duct of the turbofan engine as a second bypass flow.

9. The inlet particle separator system of claim 8, further comprising a variable bleed system having a variable flow area, wherein the variable bleed system is structured to vary the amount of the cleaned air flow used as the motive fluid.

10. The inlet particle separator system of claim 9, wherein said variable bleed system is structured to reduce the static pressure of the motive fluid to a pressure below the total pressure of the scavenge flow.

11. The inlet particle separator system of claim 9, wherein said variable bleed system includes a plurality of bleed doors positioned between a portion of the scavenge flowpath and the cleaned air flow, each bleed door having a minimum flow position and a maximum flow position; and wherein the plurality of bleed doors are structured to vary the flow area by moving between the minimum flow position and the maximum flow position within the scavenge flowpath.

12. The inlet particle separator system of claim 9, further comprising a variable guide vane structured to cooperate with said variable bleed system to direct the motive fluid through the ejector.

13. An apparatus, comprising:
a fan stage;
an inlet particle separator system in fluid communication with and upstream of said fan stage, said inlet particle separator system including:
 a separator inlet structured to receive a vitiated air flow;
 an inertial particle separator in fluid communication with the separator inlet, wherein the inertial particle separator is structured to receive the vitiated air flow and discharge a cleaned air flow and a scavenge flow, and wherein the particle separator includes an outer flowpath wall and an inner flowpath wall that define an inlet pathway;
 a first portion of the inlet pathway extending radially outward to an apex and a second portion of the inlet pathway extending radially inward from the apex such that scavenge flow is directed radially outward towards the outer flowpath wall;
 a flow splitter having an intermediate outer flowpath wall and an intermediate inner flowpath wall positioned downstream of the inertial particle separator;
 a scavenge flowpath defined by the intermediate outer flowpath wall of the flow splitter and the outer flowpath wall of the inlet pathway is positioned to receive the scavenge flow from the inertial particle separator;
 a clean air flowpath defined by the intermediate inner flowpath wall of the flow splitter and the inner flowpath wall of the inlet pathway is positioned to receive the cleaned air flow from the inertial particle separator and direct the cleaned air flow into the fan stage; and
 a variable output ejector in fluid communication with said scavenge flowpath and said clean air flowpath; wherein said variable output ejector is structured to provide a variable draw on the scavenge flowpath using a portion of the cleaned air flow exiting the fan stage as a motive fluid for operating said variable output ejector;
a gas turbine engine comprising:
a compressor section in fluid communication with the inlet particle separator system;
a combustor section in fluid communication with said compressor section; and
a turbine section in fluid communication with said combustor.

14. The apparatus of claim 13, wherein the fan stage is upstream of the ejector; wherein the fan stage is structured to pressurize the cleaned air flow, the motive fluid thereby being pressurized; and wherein said variable ejector is structured to entrain the scavenge flow using the motive fluid and to discharge a combined flowstream formed of the motive fluid and the scavenge flow.

15. The apparatus of claim 14, further comprising a turbofan bypass duct in fluid communication with the ejector, wherein the turbofan bypass duct is structured to direct the combined flowstream.

16. The apparatus of claim 15, further comprising another turbofan bypass duct structured to direct at least some of the cleaned air flow as another bypass flow different than the combined flowstream.

17. The apparatus of claim 14, further comprising another fan stage structured to receive the balance of the cleaned air flow.

18. The apparatus of claim 13, further comprising a variable bleed system having a variable flow area, wherein the variable bleed system is structured to vary the amount of the cleaned air flow used as the motive fluid.

19. The apparatus of claim 18, wherein said variable bleed system is structured to reduce the static pressure of the motive fluid to a pressure below the total pressure of the scavenge flow.

20. The apparatus of claim 18, wherein said variable bleed system includes a plurality of bleed doors that separate the scavenge flowpath from the cleaned air flowpath, each bleed door having a minimum flow position and a maximum flow position, wherein the plurality of bleed doors are structured to vary the flow area by moving between the minimum flow position and the maximum flow position within the scavenge flowpath.

\* \* \* \* \*